US010552522B2

United States Patent
Caldwell et al.

(10) Patent No.: US 10,552,522 B2
(45) Date of Patent: Feb. 4, 2020

(54) AUTOMATICALLY GENERATING A GLOSSARY OF TERMS FOR A GIVEN DOCUMENT OR GROUP OF DOCUMENTS

(71) Applicant: Microsoft Technology Licensing, LLC, Redmond, WA (US)

(72) Inventors: Nicholas Caldwell, Bellevue, WA (US); Saliha Azzam, Redmond, WA (US); Courtney Anne O'Keefe, Bellevue, WA (US); Tu Huy Phan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1109 days.

(21) Appl. No.: 14/084,598

(22) Filed: Nov. 19, 2013

(65) Prior Publication Data

US 2014/0082487 A1    Mar. 20, 2014

Related U.S. Application Data

(63) Continuation of application No. 13/170,985, filed on Jun. 28, 2011, now Pat. No. 8,589,791.

(51) Int. Cl.
*G06F 17/00* (2019.01)
*G06F 17/22* (2006.01)

(52) U.S. Cl.
CPC ............... *G06F 17/2276* (2013.01)

(58) Field of Classification Search
CPC ................................ G06F 17/30011
See application file for complete search history.

(56) References Cited

U.S. PATENT DOCUMENTS

| 5,708,825 A | * | 1/1998 | Sotomayor | G06F 17/2235 |
| | | | | 707/E17.013 |
| 6,128,635 A | * | 10/2000 | Ikeno | G06F 16/94 |
| | | | | 715/246 |
| 6,708,311 B1 | | 3/2004 | Berstis | |
| 7,376,551 B2 | | 5/2008 | Powell et al. | |
| 7,478,092 B2 | | 1/2009 | Warburton et al. | |
| 7,617,232 B2 | | 11/2009 | Gabbert et al. | |
| 8,589,370 B2 | * | 11/2013 | Feng | G06F 17/277 |
| | | | | 707/705 |

(Continued)

FOREIGN PATENT DOCUMENTS

WO    WO2011/006300    *    1/2011

OTHER PUBLICATIONS

Velardi, "Mining the Web to Create Specialized Glossaries," 2008, IEEE, pp. 18-25.*

(Continued)

*Primary Examiner* — Andrew T McIntosh

(57) ABSTRACT

Automatically generating a glossary of terms for a given document or group of documents is provided. A single document or a group of documents associated with a given project or event are parsed for one or more unique terms (e.g., words, acronyms, phrases, etc.). Identified terms are passed to a local or external definition source, and definitions for the one or more identified terms are retrieved. Retrieved definitions are presented to a user of the documents, and approved definitions are stored in a project store for subsequent use in association with the documents.

20 Claims, 5 Drawing Sheets

(56) References Cited

U.S. PATENT DOCUMENTS

| | | | |
|---|---|---|---|
| 2003/0139921 A1* | 7/2003 | Byrd | G06F 17/2775 704/10 |
| 2005/0283357 A1 | 12/2005 | MacLennan et al. | |
| 2007/0016625 A1* | 1/2007 | Berstis | G06F 17/241 |
| 2008/0154582 A1* | 6/2008 | Bruecken | G06F 17/2735 704/10 |
| 2008/0243488 A1 | 10/2008 | Balmelli et al. | |
| 2009/0006359 A1* | 1/2009 | Liao | G06F 17/2795 |
| 2010/0030765 A1* | 2/2010 | Chi | G06F 17/241 707/726 |
| 2011/0289115 A1* | 11/2011 | Schiller | G06F 17/30663 707/770 |
| 2012/0109974 A1* | 5/2012 | Feng | G06F 17/2247 707/748 |

OTHER PUBLICATIONS

Fang-Yie Leu, et al. An Automated Term Definition Extraction using the Web Corpus in Chinese Language—Published Date: 2007. http://ieeexplore.ieee.org/stamp/stamp.jsp?tp=&arnumber=4368067. pp. 6.

Gerasimos Lampouras, et al. Finding Short Definitions of Terms on Web Pages—Published Date: Aug. 2009. http://www.aclweb.org/anthology/D/D09/D09-1132.pdf. pp. 10.

Horacio Saggion. Identifying Definitions in Text Collections for Question Answering—Retrieved Date: Sep. 7, 2010. http://citeseerx.ist.psu.edu/viewdoc/download?doi=10.1.1.64.601&rep=rep1&type=pdf. pp. 4.

L. Kozakov, et al. Glossary Extraction and Utilization in the Information Search and Delivery System for IBM Technical Support. Published Date 2004. http://www.research.ibm.com/people/y/yurdaer/papers/ibmsysjournal2004a.pdf. pp. 18.

Mohammad Syafrullah, et al. Improving Term Extraction Using Particle Swarm Optimization Techniques—Published Date: 2010. http://www.scipub.org/fulltext/jcs/jcs63323-329.pdf. pp. 7.

Park, "Automatic Glossary Extraction," Proceedings of the 19th International Conference on Computational Linguistics, 2002, vol. 1, pp. 1-7.

Sierra G., Alarcon R., Molina A., and Aldan E. Web Exploitation for Definition Extraction—Published Date: 2009. http://ieeexplore.ieee.org/stamp/stamp.jsp?tp=&arnumber=5341518. pp. 7.

Velardi, "Mining the Web to Create Specialized Glossaries," 2009, IEEE, pp. 18-25.

\* cited by examiner

AUTOMATICALLY GENERATING A GLOSSARY OF TERMS FOR A GIVEN DOCUMENT OR GROUP OF DOCUMENTS

CROSS REFERENCE TO RELATED APPLICATION

This application is a continuation of application Ser. No. 13/170,985, filed Jun. 28, 2011, now U.S. Pat. No. 8,589,791, which is incorporated herein by reference in its entirety.

BACKGROUND

With the advent of systems for generating electronic content, for example, electronic documents, electronic mail messages, and the like, vast amounts of information may be transferred among users, particularly, among members of a given business, social or academic enterprise, or among members of such enterprises and persons outside the enterprise. Unfortunately, users often receive electronic content, for example, electronic documents or electronic mail messages that are filled with unfamiliar terms, acronyms, or industry jargon. Typically, when a user receives content containing unfamiliar terms, acronyms, or industry jargon, the user must interrupt his/her review or editing of the content to consult one or more sources of information for determining the meaning of such unfamiliar terms, acronyms, or industry jargon. However, because of the dynamic nature of the language, there is no one source a given user may access for definitions of such terms, acronyms or industry jargon. In any given business, social or academic enterprise, this problem may be further complicated because the enterprise may be broken into various teams each of which may have its own unique vocabulary that is developed in association with its electronic content production.

It is with respect to these and other considerations that the present invention has been made.

SUMMARY

Embodiments of the present invention solve the above and other problems by automatically generating a glossary of terms for a given document or group of documents. According to embodiments, a single document or a group of documents associated with a given project or event are parsed for one or more unique terms (e.g., words, acronyms, phrases, etc.). Identified terms are passed to a local or external definition source, and definitions for the one or more identified terms are retrieved. Retrieved definitions may be stored automatically in a project store for subsequent use. Alternatively, retrieved definitions may be presented to a user of the documents, and user-approved definitions may be stored in a project store for subsequent use in association with the documents.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
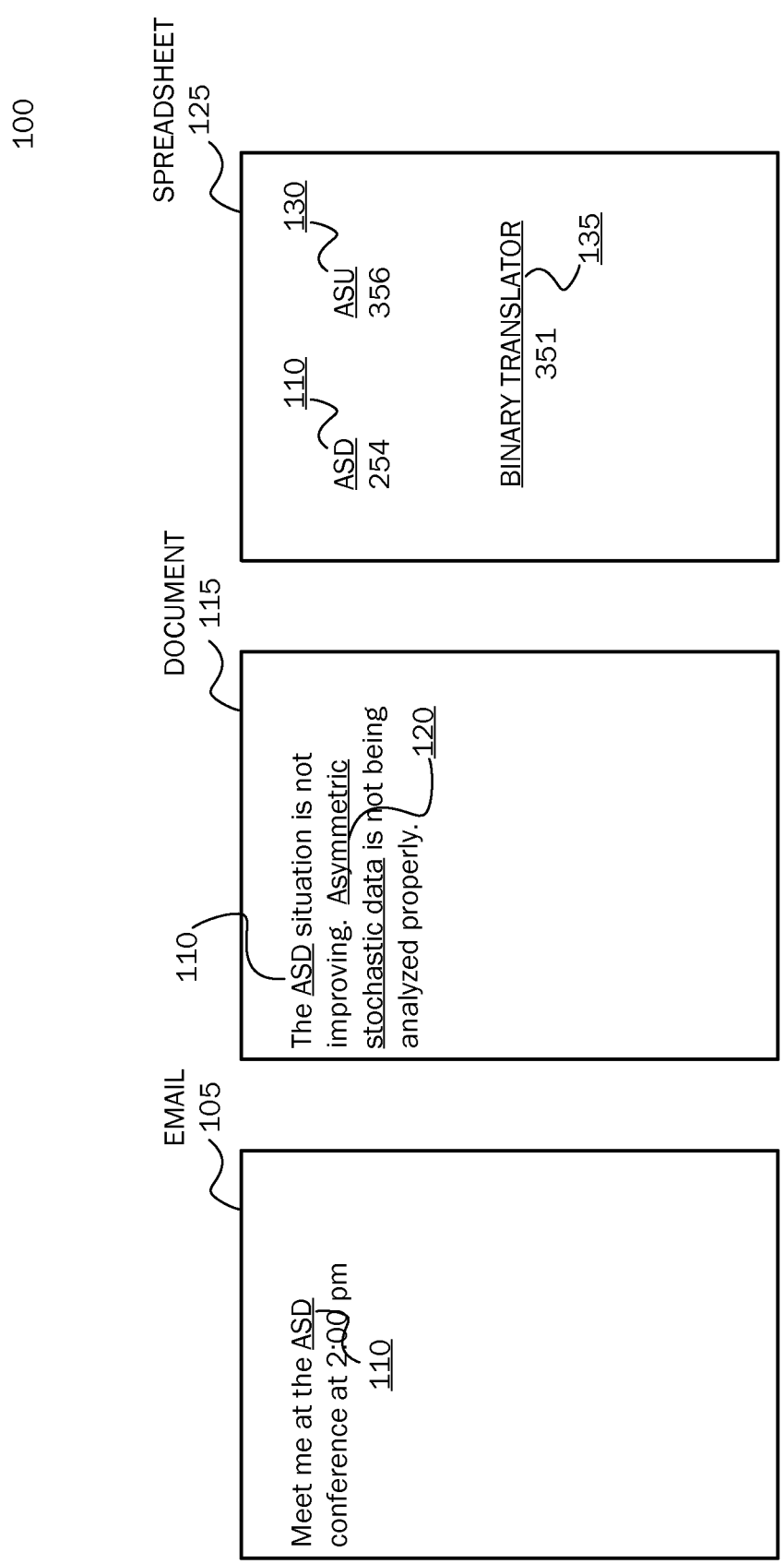
FIGS. 1A, 1B, and 1C are illustrative of electronic documents containing one or more terms for which a definition may be retrieved.

The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As briefly described above, embodiments of the present invention are directed to automatically generating a glossary of terms for a given document or group of documents. A single document or a group of documents associated with a given project or event are parsed for one or more unique terms (e.g., words, acronyms, phrases, etc.). Identified terms are passed to a local or external definition source, and definitions for the identified terms are retrieved. A local definition source may include the document from which the identified terms are extracted, and external definition sources may include a variety of sources of definitions of terms including other documents related to the current document because they are associated with the current document through a common project or event. After definitions are retrieved, definitions may be ranked and highly ranked definitions may be used to build a document glossary. Building the document glossary includes merging definition sources from both the local and external sources into a single glossary for each term requiring a definition. Candidate definitions may be presented to a user of the document via a user interface for approval. Once candidate definitions are approved, the candidate definitions may be stored in the glossary for the document and may be stored in a project glossary or definition store that may be used by subsequent users of the current document or that may be used in association with other related project or event documents containing the same identified and defined terms.

FIGS. 1A, 1B, and 1C are illustrative of electronic documents containing one or more terms for which a definition may be retrieved. As should be appreciated, any given project, collaborative workspace or event may include a single document or a group of documents each of which may contain words, phrases, acronyms, numeric strings, and the like that may be understood by the document author, but that may not be understood by others utilizing the one or more documents. For example, a given project may be created for developing and implementing a new software application for use in a line of business. Various members of a project group may generate different documents that may be distributed to other members of the group, and each of the various documents may contain terms, acronyms, phrases, numeric strings, and the like that may be understood by each of the document authors, but that may not be understood by others in the group reviewing and using the documents.

Referring to FIGS. 1A, 1B, 1C, three example documents are illustrated containing terms that may require definitions for users receiving and reviewing the documents and associated terms. For example, as illustrated in FIG. 1A, an electronic mail item 105 contains a phrase "Meet me at the ASD conference at 2 p.m." The author of the document including the acronym "ASD" 110 may understand the acronym, but the recipient of the document may not be sure about the definition of the acronym "ASD." For example, the acronym may stand for the term "Association of Software Developers," or the acronym may stand for the term "Asymmetric Software Design," or the acronym may stand for the term "Asymmetric stochastic data," or other.

Referring to FIG. 1B, a word processing document 115 is displayed having the phrase "The ASD is not improving. Asymmetric stochastic data is not being analyzed properly." This document includes an acronym and a term that may be problematic from a definitional standpoint. For example, the acronym ASD 110 may be understood by the document author, but may not be understood by subsequent users of the document. The term "asymmetric stochastic data" 120 similarly may be understood by the document author, but may not be understood by subsequent users of the document.

Referring now to FIG. 1C, a spreadsheet document 125 is illustrated having three potentially problematic terms. One column has the heading "ASD" 110, a second column has the heading "ASU" 130, and a third column has the heading "Binary Translator" 135. As with the other two documents illustrated in FIGS. 1A, 1B, and 1C, these terms may be well understood by the author of the document, but the terms may not be understood by other users of the document. As should be appreciated, the example documents illustrated in FIGS. 1A, 1B, 1C are for purposes of example only and are not exclusive of a vast number of documents that may be part of a given project, workspace, or event containing words, terms, phrases, acronyms, alphanumeric strings, and the like (hereafter "terms") that may require definition for users of the documents. According to embodiments of the present invention, such documents may be parsed for unique terms such as those described in FIGS. 1A, 1B, and 1C, and definitions may be extracted from local or external sources for building a document glossary that may be used in association with each document for providing definitions of such terms and for storing in a global or project definition store for use with other documents that may contain the same or similar terms.

Figure 2:
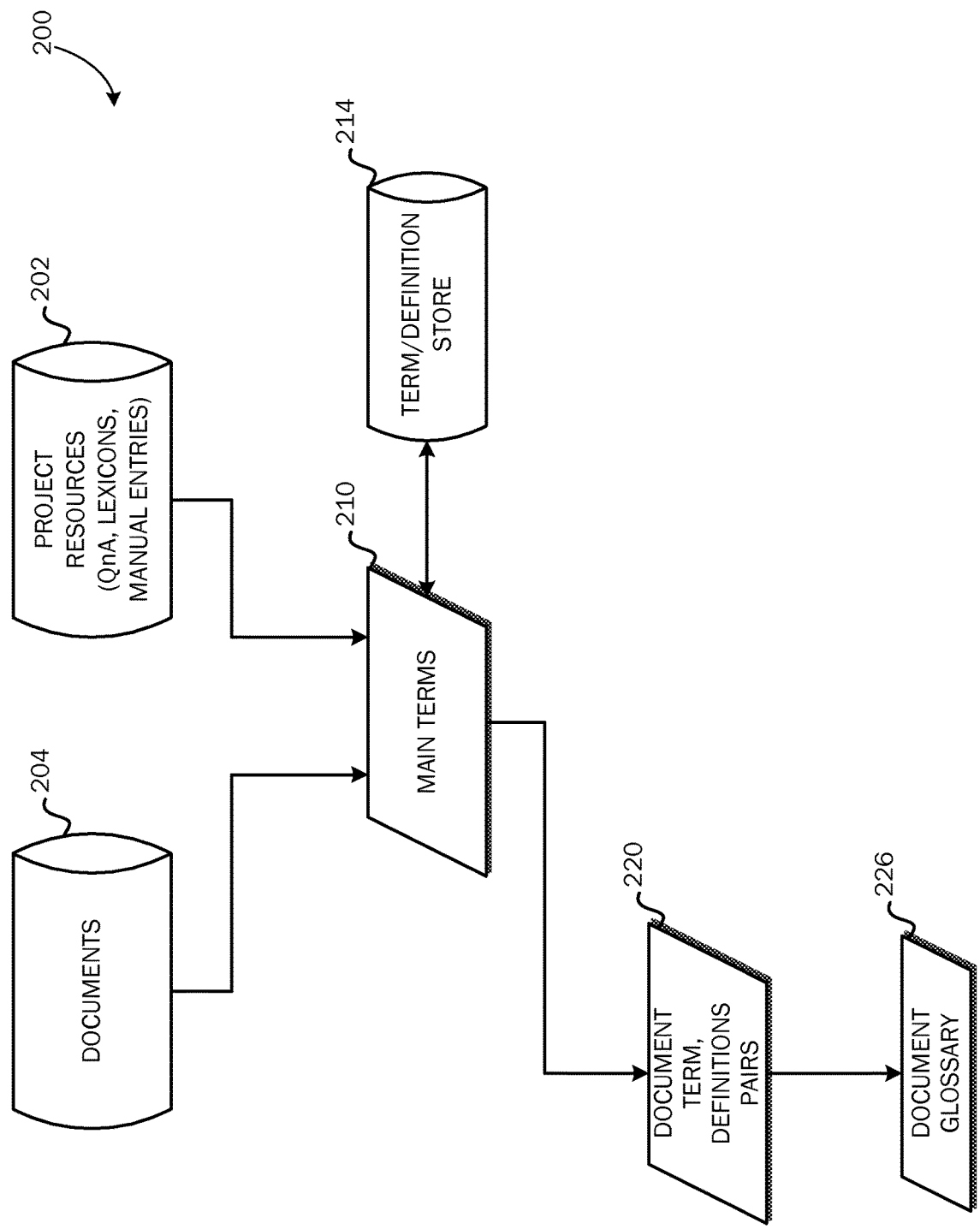
FIG. 2 illustrates a system architecture for automatically generating a glossary for one or more terms contained in one or more electronic documents.

FIG. 2 is a simplified block diagram of a system architecture 200 for automatically generating a glossary for one or more documents. According to embodiments, the automatic glossary generation system 200 may be stored for operation as a client side application on a user's local computing device 400, as described below with respect to FIG. 4, or the system 200 may reside on a remote server accessible by a user's local computing device 400 for automatically generating a glossary for a given document.

Referring still to the system architecture illustrated in FIG. 2, a documents repository 204 is illustrative of a local or remote memory storage location from which a given document, for example, the documents illustrated in FIGS. 1A, 1B, 1C may be retrieved for editing, review, transmission, or other useful manipulation. Similarly, the documents repository 204 may be a memory storage location for storing new documents created for or in association with a given project, collaborative workspace, or event. The project resources repository 202 is illustrative of a local or remote memory storage area in which may be stored one or more documents associated with a given project, collaborative workspace, or event and including various other resources including term glossaries, lexicons, question and answer pairings, and a variety of manual entries entered by users associated with the project, workspace, or event. For example, for a given project, the repository 202 may include documents such as those illustrated in FIGS. 1A, 1B, 1C, contact information for the project, task information for the project, calendar information for the project, user entered definition terms, user entered spreadsheet data, and the like.

Main terms 210 is illustrative of terms extracted from a document stored in or retrieved from the documents repository 204 or stored in or retrieved from the project resources repository 202 in association with a given document requiring term definition according to embodiments of the present invention. For example, for the document 115 illustrated in FIG. 1B, the term "asymmetric stochastic data" may be extracted from a document retrieved from the documents repository 204, and the term "asymmetric stochastic data" may likewise be extracted from one or more sources contained in the project resources repository 202 as a main term 210 requiring definition. The term/definition store 214 is illustrative of a local or remote term definition memory storage from which definitions for main terms 210 may be retrieved and to which definitions verified for a main term 210 may be subsequently stored.

The document term and definition pairs 220 are illustrative of pairings of candidate document terms and candidate term definitions that may be generated for providing definition to a term contained in one or more documents. For example, a document term/definition pair 220 may include the term "asymmetric stochastic data" contained in document 115 along with one or more candidate definitions for the term extracted from one or more local or external definition sources. The document glossary 226 is illustrative of a glossary built to contain one or more document term/definition pairings for terms extracted from a given document for which a definition is retrieved. As will be described below, the document glossary 226 may be operatively associated with a given document so that a user of the given document has quick access to the document glossary 226. The document glossary 226 for a given document may be stored in the term/definition store 214 and in the project resources repository 202 for subsequent use by other users of the given document or other documents having the same or similar terms requiring definition.

Figure 3A:
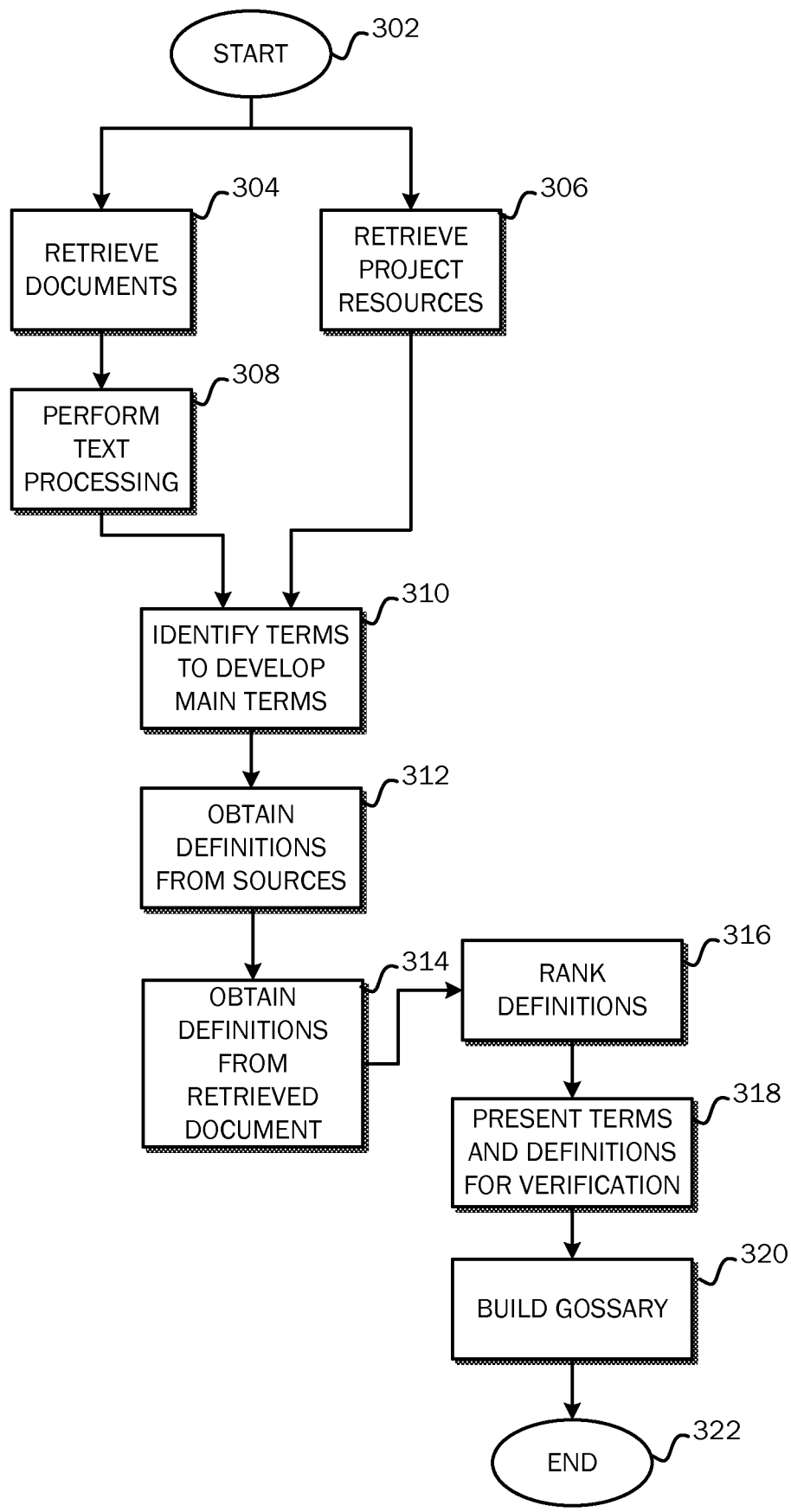
FIG. 3A illustrates a process flow for automatically generating a glossary for one or more terms contained in one or more electronic documents.

FIG. 3A illustrates a process flow for automatically generating a glossary for one or more terms contained in one or more electronic documents. The method 300 begins at start operation 302 and proceeds to operation 304 where a document requiring definitions for one or more terms is retrieved. The retrieval of documents at operation 304 may include the launching of a document previously stored by a user associated with a given project, or the document retrieval may include the retrieval of a document not previously associated with a given project. Or, the document retrieval operation 304 may include the creation of a new document that will be associated with a given project that may contain terms requiring the building of a term glossary.

In the case of the retrieval of a previously generated document, a previously built document glossary may be linked to or retrieved with the retrieved document, and the previously built document glossary may be updated or amended, as described below, based on edits performed on the retrieved document. That is, the method 300 may be performed for generating a new document glossary for a newly generated document, or may be performed for updating and/or amending a previously built document glossary each time a document having a previously built document glossary is launched and edited.

At operation 308, text preprocessing is performed on the retrieved, launched, or newly created document for breaking the document into text components that may be used for obtaining term definitions and for building a document glossary. Breaking the text into the one or more text components may include breaking the text into individual sentences followed by breaking the individual sentences into individual terms. Such text processing is well known to those skilled in the art and may include breaking text portions into individual sentences and individual terms according to known parameters. For example, punctuation marks and capitalization contained in a text portion may be utilized for determining the beginning and ending of a sentence. Spaces contained between portions of text may be utilized for determining breaks between individual terms, for example, individual words, contained in individual sentences. Alphanumeric strings following known patterns, for example, five digit numbers associated with zip codes, may be utilized for identifying portions of text. In addition, initially identified sentences or sentence terms may be passed to one or more recognizer programs for comparing initially identified sentences or terms against databases of known sentences or terms for further determining individual sentences or terms. For example, a word contained in a given sentence may be passed to a database to determine whether the word is a person's name, the name of a city, the name of a company, or whether a particular term is a recognized acronym, trade name, or the like. As should be appreciated, a variety of means may be employed for comparing sentences or terms against known words or other alphanumeric strings for further identifying those text items.

At operation 306, all project resources associated with the given project or associated with the retrieved document are accessed for obtaining information helpful in the building of a document glossary for the retrieved document. For example, if the retrieved document was previously stored along with a previously built document glossary, the document glossary may be retrieved at operation 306. In addition, any question and answer pairings associated with information contained in the retrieved document or related to the retrieved document may be accessed. For example, a question and answer store contained in the project resources repository 202 may contain question and answer pairings generated for the author of the retrieved document or generated in response to questions and answers posed by the document author and a recipient of electronic communications (e.g., electronic mail, text messaging, etc.) related to the retrieved document. Any other information, for example, manually entered text, alphanumeric data, term definitions, and the like associated with the retrieved document and stored in the project resources repository 202 may be accessed at operation 306. For example, if a user associated with a given project and having access to the project resources repository 202 for the project has manually entered a list of terms and suggested definitions for those terms, then the manually entered terms and suggested definitions may be accessed from the project resources repository 202 at operation 306 to assist in the building of or revision of a document glossary for the document retrieved or generated at operation 304. Obtaining all these types of resources aids in the term extraction process, described below at operation 310, because the greater the corpus of text-based resources that is available, the operation of identifying unique terms for building a glossary for a given document becomes more efficient and more reliable. For example, if a given term is used in multiple places across multiple resources associated with a given project or document, then the more reliable will be the term extraction process for that term owing to its use across a number of resources.

At operation 310, a term extraction process is performed for identifying terms to develop as main terms that may become candidate terms requiring term definition. At operation 310, the individual words or terms separated from the text contained in the retrieved document during the text preprocessing operation 308 may be extracted from the document and may be compared against previously defined terms stored in the term/definition store 214, described above with reference to FIG. 2. According to embodiments, such a comparison may use different methods/systems utilizing the project resources and context in which the given words or terms occur in the document. Such comparisons may insure that previously defined terms that the given words or terms are matched against are the same terms. For example, referring back to FIG. 1B, the acronym "ASD" may have two or more different meanings (e.g., "Asymmetric Data" or "Asymmetric Stochastic Data"). According to embodiments, when such a term occurs within the context of a first meaning, for example, "Asymmetric Data," the first meaning may be retrieved.

Terms extracted from the retrieved document that match defined terms in the term/definition store 214 may be set aside as not requiring additional definition retrieval. For example, a term such as "document" likely will be associated with a well known definition contained in the term/ definition store 214, and thus, such a term may be set aside as not requiring additional definition retrieval.

On the other hand, terms extracted from the retrieved document during text preprocessing that do not match terms existing in the term/definition store 214 (i.e., terms that do not have a previously generated and stored definition) may be identified for requiring a definition. If a term extracted from the retrieved document and compared against terms previously defined and stored in the term/definition store 214 results in an ambiguity where the term has multiple possible definitions, then such a term may be identified for requiring additional definition analysis, as described below. Such additional analysis may also be required where a retrieved definition does not match the context within which the associated word or term occurs in the document or other content, for example, as may occur with words or terms having multiple meanings. Each term designated as requiring a definition at operation 310 is then assembled with other terms requiring definition to form the main terms 210, described above with reference to FIG. 2, requiring new definitions or requiring updated or revised definitions for building a document glossary for the retrieved document.

As briefly described above, once terms are identified requiring new definitions or revised or updated definitions, definitions for the identified terms may be obtained from a variety of local or external definition sources. At operation 312, the identified terms may be passed to a variety of external definition sources, glossaries, online dictionaries, previously stored definitions in the project resources repository 204, and the like for obtaining definitions for the identified terms. At operation 314, definitions for the identified terms may be obtained by analyzing the text of the retrieved document for determining whether a definition for a given identified term is contained in the document from which it is extracted. According to embodiments, patterns associated with an identified term may be used for obtaining a definition for the identified term within the document from which the identified term is extracted.

For example, referring back to FIG. 1B, the acronym "ASD" is contained in the document 115. In addition, the phrase "asymmetric stochastic data" is also contained in the document 115 in close proximity to the acronym "ASD." According to an embodiment, in addition to searching for a definition for the acronym "ASD" via a local or external definition source, a definition for the acronym "ASD" may be obtained from the document from which it is extracted by looking for known patterns associated with terms such as acronyms. For example, other terms, phrases or sentences having the letters "A", "S", and "D" may be retrieved from the document as candidate definitions for the identified term. Continuing with the example in FIG. 1B, the occurrence of the letters "A", "S", "D" as initial letters of each word in the phrase "asymmetric stochastic data" may cause the phrase "asymmetric stochastic data" to be identified as a candidate definition for the acronym "ASD." Other patterns that may be utilized for identifying a candidate definition for an identified term may be a phrase following or preceding the identified term that contain words commonly associated with a provided definition. For example, if a sentence following an identified term such as "ASD" contains the phrase "the acronym ASD used herein . . . " may be identified as a pattern likely associated with a definition provided for the term inside the document from which the term is extracted.

At operation 316, any definitions retrieved for an identified term are ranked for presentation to a user of the retrieved document. For example, a definition for an identified term retrieved from a highly reputable online dictionary or definition source may be ranked higher than a definition for a term retrieved from an online definition source that may receive input and editing from various sources whose reliability may not be easily verified. On the other hand, a definition obtained from within the document from which the term is extracted, as described above at operation 314, may be ranked highly because the definition is assumed to be a definition applied to the term by the author of the document. According to one embodiment, the most highly ranked definition may be advanced to and presented to a user of the document as part of a document glossary. Alternately, a list of highly ranked definitions, for example, the top five definitions obtained from local and remote definition sources and obtained from the document from which the identified term is extracted may be provided for user selection and/or verification for ultimately building a document glossary for the retrieved document.

Figure 3B:
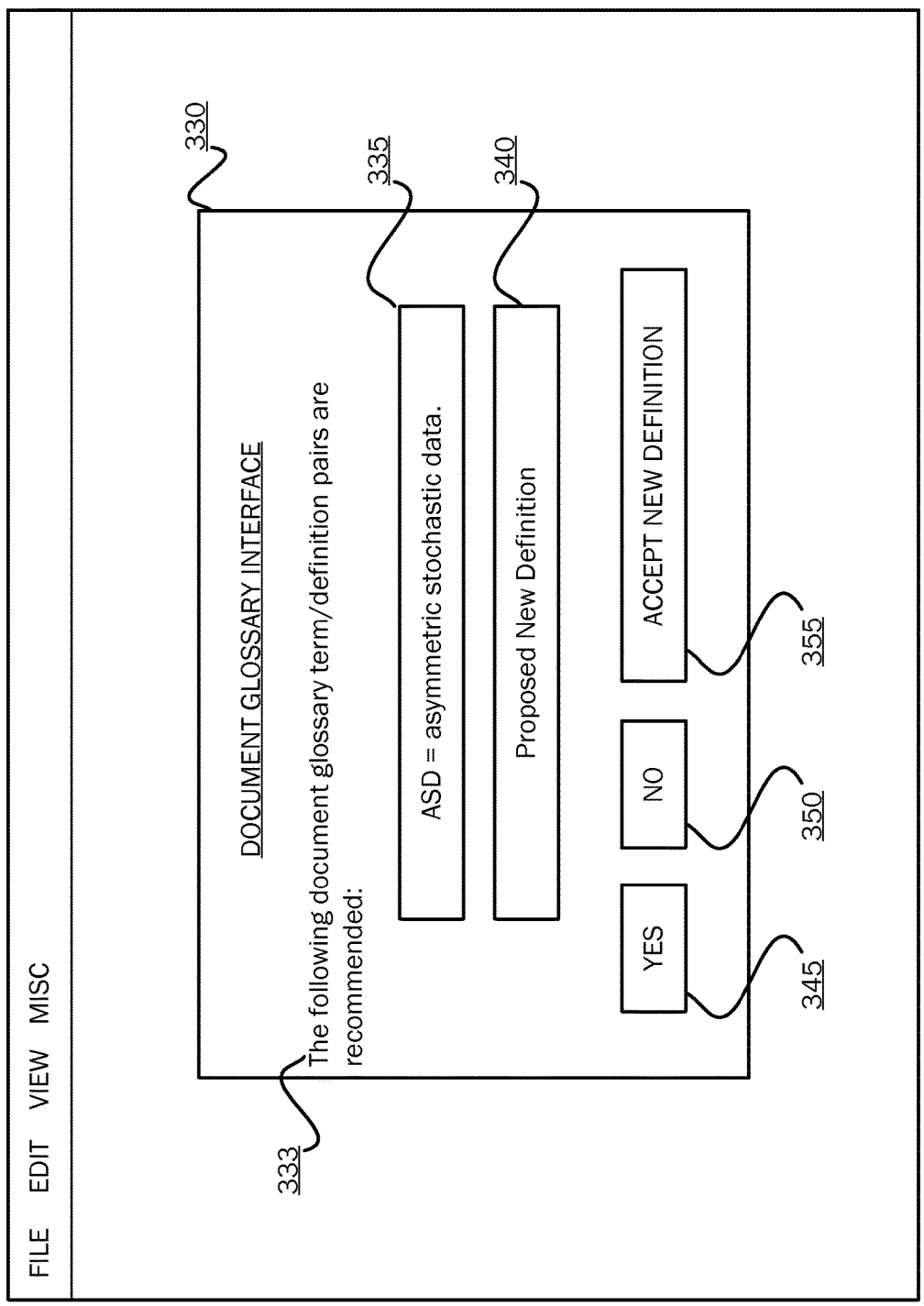
FIG. 3B illustrates a computer-generated user interface for presenting term/definition pairs for user feedback.

At operation 318, identified terms and definition pairings, for example, the term "ASD" paired with the definition "asymmetric stochastic data" along with other possible definitions for the acronym "ASD" may be presented to a user of the retrieved document for selection and/or verification. For example, a user interface component 330, illustrated in FIG. 3B below, may be presented to the user of the retrieved document informing the user that a term has been extracted from the retrieved document that may be defined according to one or more obtained definitions. Referring to the user interface illustrated in FIG. 3B, a term/definition pair may be presented in a text box/field 335. According to one embodiment, the user may make inline corrections to the presented definition, may select from a number of proposed definitions for the same term, or the user may manually enter a proposed new definition for the term in the text box/field 340. For example, the user of the retrieved document may be asked to select a definition from a list of definitions that is appropriate for the identified term according to the user's understanding of the term with respect to the retrieved document or according to the user's understanding of the identified term in general. The user may accept, reject or submit manually entered definitions using the buttons 345, 350, 355. As should be appreciated the layout and placement of text boxes, fields, controls and text in the user interface 330 is for illustration only and is not limiting of the vast number of user interface layouts and designs that may be used as described herein.

Referring back to FIG. 3A, at operation 320, a document glossary for the retrieved document is built containing definitions for all identified terms requiring definition. The document glossary then may be stored in association with the retrieved document. That is, the document glossary may be stored in the term/definition store 214, the project resources repository 202, or at another local or remote storage area, or a combination thereof. The built document glossary may be linked to the retrieved document so that subsequent launching of the retrieved document also launches the document glossary as a secondary document, or such that a link is provided in the retrieved document for obtaining the locally or remotely stored document glossary for the retrieved document. As described above, the document glossary built at operation 320 may also include the revision and/or amendment of a previously built document glossary caused by the addition of new undefined terms to a retrieved document or caused by the revision of the retrieved document causing the need for new or revised definitions to be obtained for terms contained in the retrieved document.

As described above, embodiments of the invention may be implemented via local and remote computing and data storage systems, including the systems illustrated and described with reference to FIGS. 1A, 1B, 1B, 2, 3A and 3B. Consistent with embodiments of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any other computing devices 418, in combination with computing device 400, wherein functionality may be brought together over a network in a distributed computing environment, for example, an intranet or the Internet, to perform the functions as described herein. The aforementioned system, device, and processors are examples and other systems, devices, and processors may comprise the aforementioned memory storage and processing unit, consistent with embodiments of the invention. Furthermore, computing device 400 may comprise operating environment 100 as described above. Operating environment 100 is not limited to computing device 400.

Figure 4:
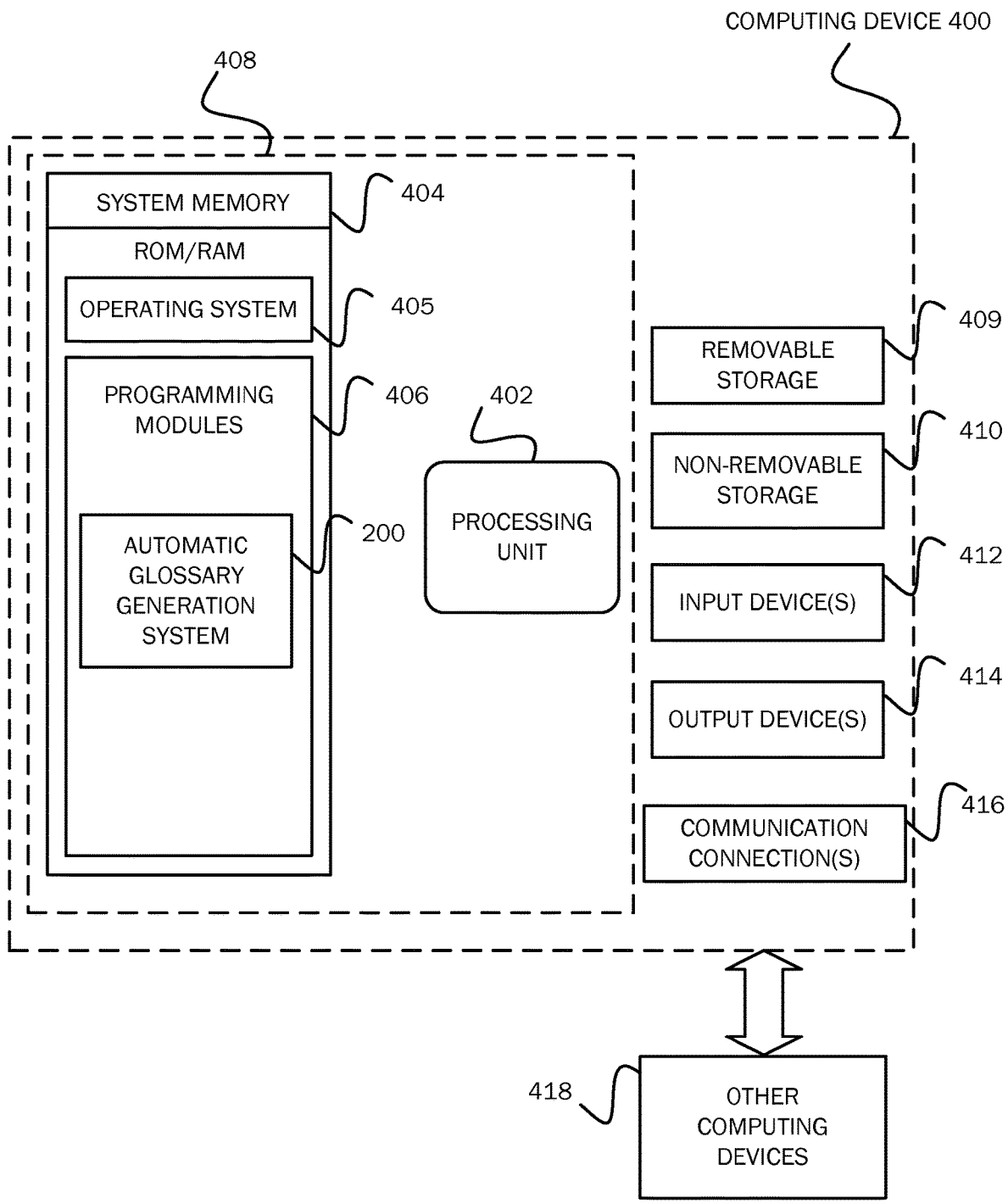
FIG. 4 is block diagram of a system including a computing device with which embodiments of the invention may be practiced.

With reference to FIG. 4, a system consistent with embodiments of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include project data aggregation and management application 407 and filtering module 122, wherein project data aggregation and management application 407 and filtering module 122 are software applications having sufficient computer-executable instructions, which when executed, performs functionalities as described herein. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

As stated above, a number of program modules and data files may be stored in system memory 404, including operating system 405. While executing on processing unit 402, programming modules 406 and may include the automatic glossary generation system 200 which may be a program module containing sufficient computer-executable instructions, which when executed, performs functionalities as described herein. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, microcode, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method of automatically generating a glossary of terms for an electronic document, comprising:
   parsing the electronic document into one or more terms for determining whether any of the one or more terms requires a definition;
   obtaining, from the electronic document, a local definition for a first term of the one or more terms from the electronic document;
   retrieving an external definition from an external definition source for the first term, the external definition source including other documents related to the electronic document;
   merging the local definition and the external definition into a listing of candidate definitions;
   presenting the one or more terms and the candidate definitions;
   receiving a selection of a term and a candidate definition;
   storing the glossary as a second document, the glossary including the selected term and candidate definition; and
   inserting a link to the second document into the electronic document, wherein the link is operable to cause the second document to launch automatically upon launching of the electronic document.

2. The method of claim 1, wherein the external definition source further includes one or more of glossaries, online dictionaries, and previously stored definitions in a repository in which the electronic document is stored.

3. The method of claim 1, wherein obtaining the local definitions for the first term contained in the electronic document further comprises identifying patterns associated with the first term for obtaining the local definitions for the first term.

4. The method of claim 3, wherein the patterns include evaluating proximity of the first term and the local definitions.

5. The method of claim 3, wherein the patterns include identifying letters associated with an acronym and retrieving one or more terms having letters associated with the acronym.

6. The method of claim 1, wherein the candidate definitions are ranked based on a reputation for reliability of a definition source from which the candidate definitions are obtained.

7. The method of claim 1, wherein the candidate definitions associated with the local definition is ranked higher than the external definition.

8. The method of claim 1, wherein the candidate definitions are ranked based on a number of definition sources across which the candidate definitions are used.

9. The method of claim 1, wherein the link is operable to cause the second document to launch automatically upon launching of the electronic document.

10. A memory storage device, having computer executable instructions which when executed by a computer perform a method of automatically generating a glossary of terms for an electronic document, comprising:
   receiving an electronic document associated with a project;
   parsing the electronic document into one or more terms for determining whether any of the one or more terms requires a definition;
   obtaining, from the electronic document, a local definition for a first term of the one or more terms from the electronic document;
   retrieving an external definition for the first term from an external definition source, wherein the external definition source includes a second electronic document related to the electronic document;
   merging the local definition and the external definition into a listing of candidate definitions;
   presenting the one or more terms and the candidate definitions;
   receiving a selection of a candidate definition for a term;

storing the glossary as a second document, the glossary including the selected term and candidate definition; and inserting a link to the second document into the electronic document, wherein the link is operable to cause the second document to launch automatically upon launching of the electronic document.

11. The memory storage device of claim 10, wherein the external definition source further includes one or more of glossaries, online dictionaries, and previously stored definitions in a repository in which the electronic document is stored.

12. The memory storage device of claim 10, wherein retrieving the local definitions from the electronic document comprises analyzing text of the electronic document to determine whether the local definitions for the first term is contained in the electronic document.

13. The memory storage device of claim 12, wherein analyzing the text of the electronic document to determine whether the local definition for the first term is contained in the electronic document further comprises the use of patterns associated with the first term for obtaining the local definition for the first term.

14. The memory storage device of claim 13, wherein the patterns include evaluating proximity of the local definition for the first term and the local definition.

15. The memory storage device of claim 13, wherein the patterns include identifying letters associated with an acronym and retrieving the one or more terms having letters associated with the acronym.

16. The memory storage device of claim 13, wherein the patterns include identifying a phrase preceding or following the first term.

17. A system for automatically generating a glossary of terms for an electronic document, comprising:

a processing unit; and a memory having computer executable instructions which when executed by a processing unit provides one or more programming modules operable to:

receive an electronic document associated with a project;

parse the electronic document into one or more terms for determining whether any of the one or more terms requires a definition;

obtain, from the electronic document, a local definition for a first term of the one or more terms from the electronic document;

retrieve an external definition for the first term from a second document associated with the electronic document via the project;

merge the local definition and the external definition into a listing of candidate definitions;

present the one or more terms and the candidate definitions, wherein the candidate definitions are ranked based on reliability of each candidate definition;

receive a selection of a candidate definition for a term;

store the glossary, the glossary including the selected term and candidate definition; and inserting a link to the glossary into the electronic document, wherein the link is operable to cause the second document to launch automatically upon launching of the electronic document.

18. The system of claim 17, wherein additional external definitions are retrieved from external definition sources in addition to the second document, wherein the candidate definitions from documents associated with the project are determined to be more reputable than the candidate definitions from external definition sources and are ranked higher.

19. The system of claim 17, wherein the candidate definitions associated with the local definitions are ranked higher than the candidate definitions associated with the external definitions.

20. The system of claim 17, wherein the one or more programming modules are further operable to store the glossary as a second document, wherein the link is operable to cause the second document to launch automatically upon launching of the electronic document.

* * * * *